United States Patent
Murphy et al.

(10) Patent No.: US 7,438,864 B2
(45) Date of Patent: Oct. 21, 2008

(54) PURIFIER

(75) Inventors: William Murphy, Homer, NY (US); Eric Edlund, Homer, NY (US); Kurt Brown, Corland, NY (US)

(73) Assignee: Pall Corporation, East Hills, NY (US)

( * ) Notice: Subject to any disclaimer, the term of this patent is extended or adjusted under 35 U.S.C. 154(b) by 632 days.

(21) Appl. No.: 10/470,949

(22) PCT Filed: Feb. 8, 2002

(86) PCT No.: PCT/US02/03491

§ 371 (c)(1),
(2), (4) Date: Jan. 30, 2004

(87) PCT Pub. No.: WO02/064237

PCT Pub. Date: Aug. 22, 2002

(65) Prior Publication Data

US 2004/0115105 A1   Jun. 17, 2004

Related U.S. Application Data

(60) Provisional application No. 60/267,095, filed on Feb. 8, 2001.

(51) Int. Cl.
*B01D 50/00*   (2006.01)
(52) U.S. Cl. .................................. 422/177; 422/168
(58) Field of Classification Search ............... 422/168, 422/170, 171, 177; 423/210, 219, 262
See application file for complete search history.

(56) References Cited

U.S. PATENT DOCUMENTS

| 3,800,532 | A |   | 4/1974 | Schischkow |
| 3,896,616 | A | * | 7/1975 | Keith et al. ................. 422/171 |
| 5,204,075 | A | * | 4/1993 | Jain et al. .................... 423/219 |
| 5,238,670 | A |   | 8/1993 | Louise et al. |
| 5,456,740 | A |   | 10/1995 | Snow et al. |
| 5,545,242 | A |   | 8/1996 | Whitlock et al. |
| 5,637,544 | A |   | 6/1997 | Shadman |
| 5,829,139 | A | * | 11/1998 | Murphy et al. ........... 29/896.62 |
| 6,066,591 | A |   | 5/2000 | Murphy et al. |

FOREIGN PATENT DOCUMENTS

EP   0 697 232 A1   2/1996
WO   WO 95/25146   9/1995

OTHER PUBLICATIONS

Xue et al., Organometallic Chemical Vapor Deposition of Platinum, Reaction Kinetics and Vapor Pressures of Precursors (1992).

* cited by examiner

*Primary Examiner*—Glenn Caldarola
*Assistant Examiner*—Randy Boyer
(74) *Attorney, Agent, or Firm*—Leydig, Voit & Mayer, Ltd.

(57) ABSTRACT

In a system having a component 106 which is capable of reacting with a gaseous contaminant in a gas stream, a purifier assembly 102 is positionable in the gas stream and comprises a purifier medium 112 that reacts with the gaseous contaminant in a manner in which is substantially similar to the manner in which the component 106 reacts with the gaseous contaminant.

5 Claims, 1 Drawing Sheet

PURIFIER

TECHNICAL FIELD

The present invention relates to devices and methods for purifying gas streams. More particularly, the present invention relates to devices and methods for removing contaminants, including gaseous contaminants, from gas streams.

BACKGROUND OF THE INVENTION

In many industries, a high purity gas stream is used in a system for manufacturing a product. These systems may include a variety of components, including tubing, valves, orifices, and sensors, such as flow sensors, pressure sensors and temperature sensors. For example, in the semiconductor industry, a high purity nitrogen gas stream may be used in a system for manufacturing silicon wafers. The system may include an oxygen sensor for monitoring the amount of oxygen in the nitrogen gas stream, and the oxygen sensor may be made of a platinum metal.

Unfortunately, the high purity gas stream frequently contains gaseous contaminants which can adversely react, chemically or physically, with the components of the system. Although the source of these gaseous contaminants may be external to the system, in many instances the gaseous contaminants are generated within the system itself, e.g., during the process of manufacturing the product. For example, $SiO_2$ and other gaseous contaminants may be generated during the process for manufacturing the silicon wafers. These gaseous contaminants may be swept into the nitrogen gas stream and carried to the oxygen sensor. The platinum metal in the oxygen sensor reacts with the gaseous contaminants in the gas stream, damaging the oxygen sensor. This and other types of adverse reactions can occur with many components in many different systems, and damaged components can seriously degrade the reliability of the products produced by any system. Consequently, the components of these systems are subject to constant recalibration, extensive preventive maintenance, and frequent premature failure, which result in frequent shut downs that substantially reduce the efficiency of the systems.

SUMMARY OF THE INVENTION

Embodiments of the present invention may address one or more of the previously described problems as well as many other problems associated with contaminants in gas streams.

In accordance with one aspect of the invention, a purifier assembly may be used in a system which has a component that is capable of reacting with a gaseous contaminant in a gas stream. The purifier assembly may be positioned in the gas stream upstream of the component, and the purifier assembly may comprise a bed of particulate material or a mass of fibrous material. The material of the purifier medium is selected to react with the gaseous contaminant in a manner which is substantially similar to the manner in which the component reacts with the gaseous contaminant, thereby reducing or even eliminating the gaseous contaminant in the gas stream.

In accordance with another aspect of the invention, a purifier may be used in a system which has a component that is capable of reacting with a gaseous contaminant in a gas stream. The purifier may be positioned in the gas stream upstream of the component, and the purifier may comprise a filter and a purifier medium. The filter removes particle contaminants from the gas stream. The purifier medium is positioned in the gas stream discrete from the filter. The purifier medium includes a material which is selected to react with the gaseous contaminant in a manner which is substantially similar to the manner in which the component reacts with the gaseous contaminant, thereby reducing or even eliminating the gaseous contaminant from the gas stream.

In accordance with another aspect of the invention, a purifier assembly for purifying a gas stream may comprise a purifier medium. The purifier medium may include a bed of particulate material or a mass of fibrous material, and the material has at least a metal surface. The metal of the purifier medium may be iron, ruthenium, osmium, cobalt, rhodium, iridium, nickel, palladium, platinum, copper, silver, gold, zinc, vanadium, and chromium and mixtures thereof.

In accordance with another aspect of the invention, a purifier for removing contaminants from a gas stream may comprise a housing, a purifier assembly, and a filter. The housing may have an inlet and an outlet and define a gas flow path between the inlet and the outlet. The purifier assembly may be disposed in the housing in the gas flow path discrete from the filter. The purifier assembly may include a purifier medium having a metal surface which is capable of reacting with gaseous contaminants in the gas stream. The filter is disposed in the housing in the gas flow path and removes particle contaminants from the gas stream.

In accordance with another aspect of the invention, a method of protecting a component capable of reacting with a gaseous contaminant in a gas stream comprises passing the gas stream through a purifier medium before the gas stream is directed past the component. Passing the gas stream through the purifier medium includes passing the gas stream through a bed of particulate or a mass of fibrous material that reacts with the gaseous contaminants in a manner substantially similar to the manner in which the component reacts with gaseous contaminants, thereby reducing or even eliminating gases components from the gas stream.

Devices and method embodying the invention may include one or more of these various aspects of the invention. Embodiments which feature a purifier medium having a material or a metal surface that reacts with the gaseous contaminants in the gas stream protect components of the system very effectively. The purifier medium may be located upstream of the component, so the gaseous contaminants react with the purifier medium first. In reacting with the gaseous contaminants, the purifier medium may pull the gaseous contaminants out of the gas stream or otherwise render the gaseous contaminants incapable of damaging the component. Consequently, a highly purified gas stream continues past the purifier medium and past the component without causing any damage to the component.

DESCRIPTION OF EMBODIMENTS

Figure 1:
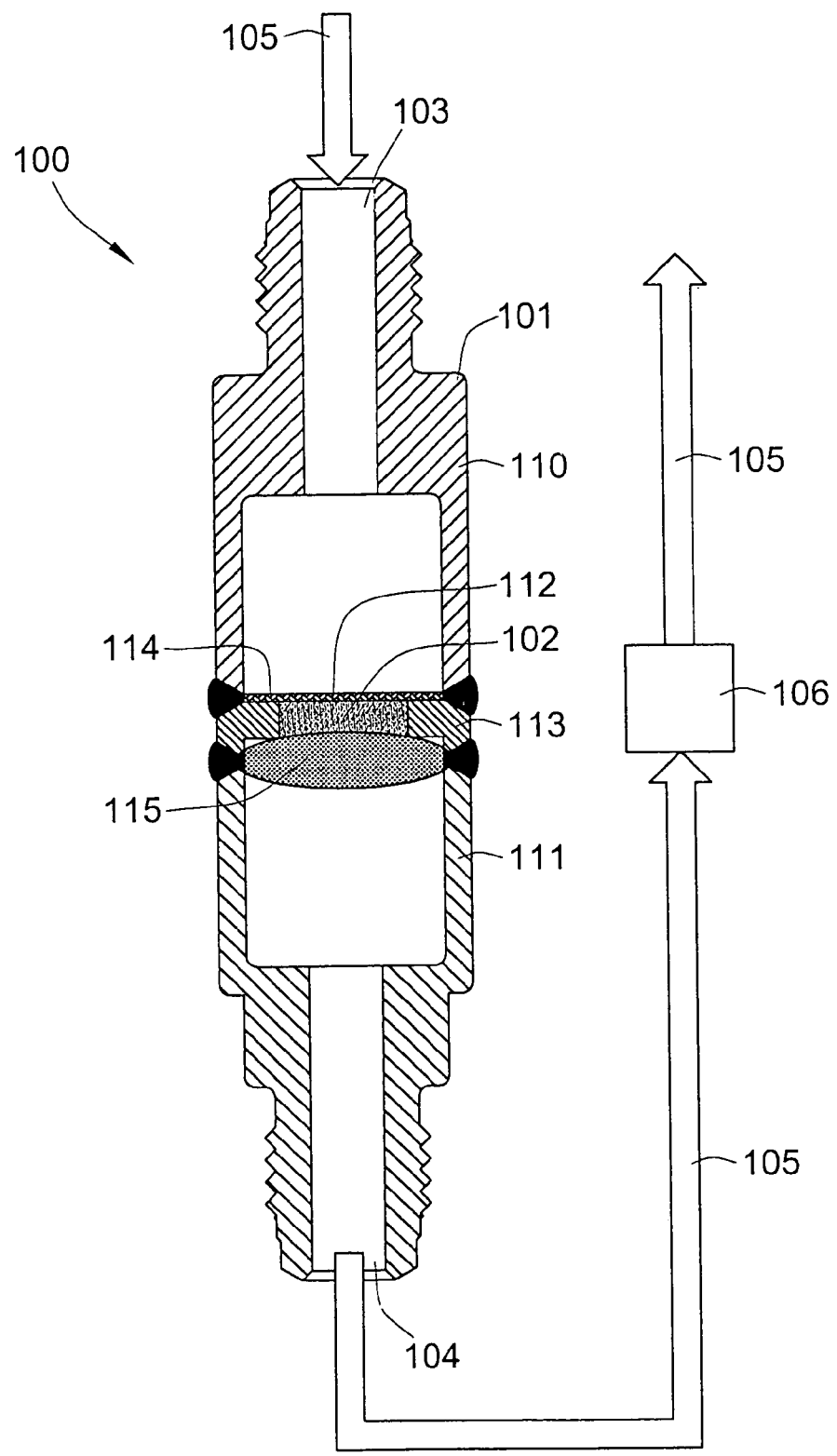
FIG. 1 is a cross sectional view of one example of a purifier in a system with a component.

Devices and methods which purify gas streams in accordance with the invention may be used to protect one or more components of a system from gaseous contaminants in a gas stream. Any component of a system in contact with the gas stream may be protected, including, for example, tubing walls, valves, orifices, sensors, and transducers. The gas stream may comprise, for example, any process gas, including high purity process gases such as nitrogen, argon, hydrogen, and helium. The gaseous contaminants may include a wide variety of gases, including, for example, organometalic compounds such as arsine, phosphine, and silicon containing gases, e.g., $SiO_2$. Other gaseous contaminants may include carbon dioxide and hydrocarbons.

The component may adversely react to the gaseous contaminants in a wide variety of ways, both physically and chemically. For example, the gaseous contaminant may plate, condense, coalesce, adsorb, absorb or otherwise be deposited onto one or more materials of the component in the gas stream. Alternatively or additionally, the gaseous contaminant may oxidize, reduce, form a complex with, or catalyze a reaction with the material of the component. A purifier embodying the invention may be operatively associated with the component, e.g., by inserting the purifier in the gas stream upstream of the component. In preferred embodiments, the purifier may include a purifier medium that will be affected by the gaseous contaminant in much the same way that the material of the component being protected would otherwise be affected, thereby sacrificially protecting the component. For example, the purifier medium may react with a gaseous contaminant in a manner substantially similar to the manner in which the component would otherwise react to the gaseous contaminant, thereby pulling the gaseous contaminant from the gas stream or otherwise rendering the gaseous contaminant incapable of damaging the component, for example, by altering the physical or chemical properties of the gaseous contaminant.

Purifiers embodying the invention may be configured in a wide variety of ways. One example of a purifier 100 is shown in cross section of FIG. 1. Generally, the purifier 100 may include a housing 101 and a purifier assembly 102 operatively associated with the housing 101. The housing may be formed from any suitably impervious material which is compatible with the gas stream, including, for example, a polymeric material or a metal such as stainless steel. The housing 100 preferably includes at least one inlet 103 and at least one outlet 104 and defines a gas flow path between the inlet 103 and the outlet 104. However, the housing is not limited to any particular shape. For example, the housing may be designed as a top mount assembly or a T-type assembly for the microelectronics industry and may include both the inlet and the outlet on the same end of the housing. In the illustrated embodiment, the housing 101 may be designed as in-line assembly having a cylindrical configuration with the inlet 103 at one end and the outlet 104 at the opposite end. The inlet 103 and the outlet 104 may be configured as fittings and may be joined to corresponding fittings in a gas supply line 105 which may fluidly communicate with the component 106 of the system to be protected. Further, the housing may comprise a one-piece or multi-piece structure. For example, the housing may include a body defining a cavity for the purifier assembly and a head or base detachably or permanently mounted to the body. In the illustrated embodiment, the housing 101 preferably comprises two hollow, generally cylindrical portions, e.g., an inlet portion 110 and an outlet portion 111, which may be permanently coupled, e.g., bonded or welded.

The purifier assembly may be cooperatively arranged with the housing in a variety of ways. For example, the purifier assembly may be mounted to the housing at the inlet and/or the outlet or within the housing. The purifier assembly may be the sole component within the housing, or the housing may include the purifier assembly and one or more additional components, such as the component to be protected. For example, the purifier assembly may be mounted near the inlet of the housing and the component to be protected by the purifier assembly may be mounted inside the housing between the inlet and the outlet. The purifier assembly may be fitted to the housing in a variety of ways, for example, the purifier assembly may be removably mounted or permanently mounted to or in the housing. The purifier assembly is preferably fitted to or in the housing completely across the gas flow path or the gas stream. However, the purifier assembly may be disposed in the gas stream not completely across the gas stream but in sufficient contact with the gas stream to remove or otherwise render harmless a sufficient amount of the gaseous contaminants to protect the downstream component. In the illustrated embodiment, the purifier assembly 102 is preferably disposed completely across the gas flow path defined by the housing 101 and permanently attached to the housing 101, e.g., by bonding or welding the purifier assembly 102 to the housing 101.

The purifier assembly may be variously configured. For example, the purifier assembly may have a generally disc-shaped configuration or a solid generally cylindrical configuration through which the gas stream may pass axially. As another example, the purifier may have a hollow generally cylindrical configuration through which the gas stream may pass radially inside-out or outside-in. As yet another example, the purifier assembly may have a generally cup-shaped configuration. The cross section of any of these configurations may be regular, e.g., circular or polygonal, or may be irregular. In the illustrated embodiment, the purifier assembly 102 preferably has a generally disc-shaped configuration with a generally circular cross section. Further, the purifier assembly may be configured as a single piece structure or a multi-piece structure. The purifier assembly preferably comprises one or more purifier media and may comprise additional structures for supporting the one or more purifier media, for example, within the housing. In the illustrated embodiment, the purification assembly 102 includes a purifier medium 112 contained by an annular ring or spool 113 and upstream and downstream porous barriers 114, 115. However, the supporting structures may vary widely from one purifier assembly to another depending, for example, on the nature of the purifier medium. In some embodiments, the housing may support the purifier medium without any additional supporting structures.

The purifier medium preferably comprises a material that will be affected by gaseous contaminants in the gas stream in a manner substantially similar to the way in which the material of the component being protected would otherwise be affected by the gaseous contaminants. Thus, the material of the purifier medium may be identical to the material of the component being protected or analogous to the material of the component being protected, i.e., capable of reacting to the gaseous component in a substantially similar manner. Two or more purifier media may be included, for example, where different components within the system are to be protected. For many embodiments, the material of the purifier medium preferably comprises a metal, mostly including, for example, noble metals and Group VIII metals. More preferably, the metal of the purification medium may comprise one or more of the following metals: iron, ruthenium, osmium, cobalt, rhodium, iridium, nickel, palladium, platinum, copper, silver, gold, zinc, vanadium, and chromium and mixtures of these metals. The material of the purification medium may include only a single constituent, e.g., a single metal, or may be combined with various other constituents, including additional metals and/or non-metals such as sorbents and catalysts.

The purification medium may comprise any suitable form. For example, the purification medium 112 may be in the form of one or more masses of fibrous material, such as a mat, a gauze, a wool, a non-woven web, or a mesh, e.g., a woven web, in one or more layers. The fibers of the fibrous material have any suitable diameter, e.g., several thousands of an inch or less, and any suitable length, e.g., several inches or less. The fibers may be a substantially pure form of the purifier material selected to react with the gaseous contaminants. For example, each fiber may entirely consist of a metal. Alternatively, each fiber may comprise a combination of the selected purifier material and one or more other materials. Preferably, however, the fiber at least includes the selected purifier material as a surface which may be contacted by the gas stream. For example, each fiber may comprise a metal, ceramic, or polymeric base material coated with the selected purifier material in any suitable manner. The mass of fibrous material is preferably compressed to provide a uniform density. Even more preferably, the mass of fibrous material may be fashioned as a preform, e.g., a fibrous structure having predetermined dimensions, and the preform may have any suitable configuration such as a disc-shaped configuration or a cylindrically shaped configuration.

Alternatively, the purification medium 112 may comprise one or more beds of particulate material. The particulate material may be beaded, granular, or powdery, and the individual particles may have various regular or irregular shapes including dendritic, acicular, fibril, and spherical. The particles may be a substantially pure form of the purifier material selected to react with the gaseous contaminants. For example, each particle may entirely consist of a metal. Alternatively, each particle may comprise a combination of the selected purifier material and one or more other materials. Preferably, however, the particle at least includes the selected material as a surface which may be contacted by the gas stream. For example, the particles may comprise a metal, ceramic, or polymeric base material coated with the selected purifier material in any suitable manner. The nominal size and amount of the particulate material and the size of the particulate bed may vary widely, depending on such factors as the desired capacity and efficiency of the bed and the desired flow parameters, e.g., pressure drop and flow rate, through the bed. In some embodiments, size of the particulate material may be less than about 1/20th of the lateral dimension, e.g., diameter, of the particulate bed, more preferably less than about 1/100th of the lateral dimension. Further, the bed of particulate material may be immobilized, for example, by a binder or in a fibrous matrix or by sinter bonding the particles to one another and/or a substrate. Preferably, the particles of the bed are not bonded to one another but are packed within the bed sufficiently tightly to prevent the bed from fluidizing and/or forming channels in the bed as the gas stream flows through the bed. The bed of particulate material may completely fill the housing, or the particulate material may occupy less than the internal volume of the housing.

In the illustrated embodiment, the purifier medium 112 preferably comprises a bed of particulate material which may be radially contained within the annular ring 113. For example, the purification medium 112 may comprise a bed of particulate material tightly packed within the annular ring 113. The inner diameter of the annular ring may be greater than the inner diameter of the housing but is preferably substantially equal to or, even more preferably, somewhat less than the inner diameter of the housing 101. The thickness and the inner diameter of the annular ring 113 may vary depending on factors such as the amount and size of the particulate material to be contained within the bed. For example, the bed of particulate material may have a diameter of about 0.75 inch or less, e.g., about 0.50 inch or less, and a thickness of about 0.250 inch or less, e.g., about 0.125 inch or less, and the bed may contain about 3 grams or less, e.g., about 2 grams or less, of metal particles having a size of about 100μ or less, e.g., in the range from about 10μ to about 45μ. For embodiments intended to protect an oxygen sensor having a platinum surface in the gas stream, particles of platinum metal, such as those available from Alfa Aesar, A Johnson Matthey Company of Ward Hill, Mass., may be selected for the purifier material.

The porous barriers 114, 115 are preferably disposed on both sides of the bed to axially contain particulate material within the bed. The porous barriers may be bonded, e.g., welded along their edges, and completely contain the bed of particulate material without significant additional structure. In the illustrated embodiment, the porous barriers are cooperatively arranged with additional supporting structure, such as the annular ring 113, to contain the bed of particulate material, e.g., within the interior of the annular ring 113. The size of the openings in the porous barrier 114, 115 depends on the size of the particulate material in the bed, finer particulate material indicating smaller openings in the porous barrier. The porous barrier may comprise any suitably porous structure such as a fibrous web, a mesh, a porous membrane or a porous composite material, and may be formed from any suitable material such as metal or polymer. In the illustrated embodiment, the upstream porous barrier 114 preferably comprises a porous composite material including a layer of PMF™ 316L stainless steel porous medium sandwiched between layers of sintered Rigimesh® (Grade K) porous medium having a composite gaseous removal efficiency of about 10e2 at 0.4 microns.

The downstream porous barrier 115 may be identical or similar to the upstream porous barrier 114. However, in many embodiments, the downstream porous barrier may comprise a high efficiency filter having a gaseous removal efficiency, for example, on the order of 10e4, more preferably on the order of 10e6, and even more preferably on the order of 10e9, for 3 nanometer particles. A high efficiency filter is available from Pall Corporation under the trade designation Mini ULTRAMET-L™ 1100 Series Assembly. A high efficiency filter not only serves to contain the particles of purification material within the bed, it also removes solid contaminants from the gas stream. While the purifier medium 112 is preferably located upstream of the high efficiency filter, it may be located downstream of the high efficiency filter or it may be sandwiched between portions of the high efficiency filter. However, in preferred embodiments, the purifier medium, whether upstream, downstream or within the high efficiency filter, is disposed in the gas stream discrete from the high efficiency filter, e.g., the purifier medium and the filter are preferably positioned at discrete locations within the gas stream. Combining the purifier medium with the high efficiency filter, e.g., by coating the high efficiency filter with the selected purification material, may result in design trade offs and degraded performance.

The purifier may be fabricated in a wide variety of ways depending, for example, on the desired configuration of the purifier and the nature of the purifier medium. For example, in the illustrated embodiment, the downstream porous barrier 115, e.g., the high efficiency filter may be joined between the open end of the outlet portion 111 of the housing 101 and a rim of the annular ring 113. These components are preferably joined by a bond, e.g., an adhesive or solvent bond, or, more preferably, a weld, which seals them to one another, seals the outer edge of the downstream porous barrier 115, and forces the downstream barrier 115 tightly against the face of the annular ring 113, defining a pocket between the downstream porous barrier 115 and the wall of the annular ring 113.

The purifier medium 112 may be selected in accordance with the material of a component to be protected and then positioned in the pocket. For example, a mass of fibrous material selected in accordance with the component being protected may be positioned in the pocket. In particular, a preform of the fibrous mass having dimensions corresponding to, e.g., slightly larger than, the dimensions of the pocket may be inserted in the pocket, preferably, with a interference fit between the edge of the preform and the inner wall of the annular ring. Alternatively, a bed of particulate material selected in accordance with the component to be protected may be deposited within the pocket. The particular material may be wet laid in the pocket on the downstream porous barrier 115 but is preferably dry laid in any suitable manner. For example, an amount of the selected particulate material may be dry laid in the pocket and compacted, e.g., by vibrations and/or force, to pack the bed. An additional amount of selected particulate material may then again be dry laid and compressed, and this process may continue until the pocket is filled or, more preferably, slightly overfilled, with a packed bed of selected particulate material.

Once the purifier medium has been disposed in the pocket of the annular ring 113, the upstream porous barrier 114 may be joined between the open end of the inlet portion 110 of the housing 101 and the opposite rim of the annular ring 113. Again, these components are preferably joined by a bond or a weld which seals them to one another, seals the outer edge of the upstream porous barrier 114, and forces the upstream porous barrier 114 tightly against the face of the annular ring 113, tightly confining the purifier medium 112 within the pocket of the annular ring 113.

Once the purifier is fabricated, it may be positioned in the gas stream upstream from the component 106 to be protected, for example, by inserting the purifier into the gas supply line 105. The gas stream passes along the gas supply line 105 through the purifier 100, and a substantial portion of, preferably all of, the gas in the gas stream contacts, e.g., passes through, the purifier medium 112. The gaseous contaminants in the gas stream react with the purifier medium 112 in a manner substantially similar to the manner in which the material of the component 106 would otherwise react with the gaseous contaminants. By reacting with the gaseous contaminants in a manner similar to that of the component 106, the purifier medium 112 may pull the gaseous contaminants out of the gas stream, substantially reducing the amount of gaseous contaminants in the gas stream and/or may otherwise render the gaseous contaminants incapable of harming the component 106, for example, by chemically reacting with the gaseous contaminants and transforming the gaseous contaminants into substances which are not harmful to the component 106.

From the purifier medium 112, the gas stream may pass through the high efficiency filter and then past the component 106. Because the gas stream has been purified by the purifier medium 112, the component 106 remains unharmed by the gas stream. The component 106 thus functions more reliability for a much longer period of time, eliminating frequent shutdowns for recalibrating, maintaining and/or replacing a damaged component. Consequently, the system operates much more efficiently and reliably.

While the invention has been described in some detail by way of various embodiments, the invention is susceptible to various modifications and alternative forms and is not restricted to the specific embodiments previously described and illustrated. For example, a purifier assembly may include both a mass of fibrous material and a bed of particulate material, either separate or dispersed within one another. Further, in the illustrated embodiment, the purifier assembly comprises a purifier medium disposed across the gas flow path and spaced from the component being protected. Alternatively, the purifier assembly may comprise any other porous structure which includes the purification medium and encapsulates or otherwise covers the component and protects the component from gaseous contaminants in the fluid stream. For example, the purifier assembly may comprise a porous jacket which is formed from or coated with the material selected to protect the component. Thus, the specific embodiments disclosed are not intended to limit the invention, but on the contrary the invention is intended to cover all modifications equivalence and alternatives falling within the spirit and scope of the inventions defined by the following claims.

All references cited herein including publications, patents, and patent applications, are hereby incorporated in there entireties by reference.

What is claimed is:

1. A purifier for removing contaminants from a gas stream, the purifier comprising a housing having an inlet and an outlet and defining a gas flow path between the inlet and the outlet, a filter disposed in the housing in the gas flow path to remove particle contaminants, and a purifier assembly cooperatively arranged within the housing in the gas flow path discrete from the filter, wherein the purifier assembly includes a purifier medium including a packed bed of unbonded metal particulate material capable of reacting with a gaseous contaminant in the gas stream, wherein the metal particulate material includes metal particles having a size less than about 100 µ and wherein the metal particles have a surface which is exposed to react with the contaminants of the gas stream.

2. The purifier of claim 1 wherein the purifier assembly is disposed in the housing.

3. The purifier of claim 1 wherein the purifier medium is positioned upstream of the filter.

4. The purifier of claim 1 wherein the purifier medium comprises a bed of particulate metal, the metal being selected from the group consisting of iron, ruthenium, osmium, cobalt, rhodium, iridium, nickel, palladium, platinum, copper, silver, gold, zinc, vanadium, and chromium and mixtures thereof and particles of the metal having a size less than about 100 µ.

5. The purifier assembly of claim 1 wherein the filter comprises a high efficiency filter.

* * * * *